(12) United States Patent
Gombert et al.

(10) Patent No.: US 6,327,925 B1
(45) Date of Patent: Dec. 11, 2001

(54) LINEAR DRIVE UNIT

(75) Inventors: Bernd Gombert, Grafrath; Bertram Willberg, Schöngeishing, both of (DE)

(73) Assignee: Deutsches Zentrum fur Luft-und Raumfahrt E.V., Bonn (DE)

( * ) Notice: Subject to any disclaimer, the term of this patent is extended or adjusted under 35 U.S.C. 154(b) by 0 days.

(21) Appl. No.: 09/199,548

(22) Filed: Nov. 25, 1998

(30) Foreign Application Priority Data

Nov. 28, 1997 (DE) ............................................. 197 52 696

(51) Int. Cl.$^7$ .................................................. F16H 25/20
(52) U.S. Cl. ........................... 74/110; 74/89.15; 74/99 A; 187/268
(58) Field of Search ........................... 187/250, 267, 187/268; 74/89, 89.15, 99 A, 110

(56) References Cited

U.S. PATENT DOCUMENTS

| 3,968,861 | * | 7/1976 | Kernen ................................... 187/250 |
| 4,089,624 | * | 5/1978 | Nichols et al. ...................... 74/89.15 |
| 4,534,234 | * | 8/1985 | Cosenza ............................... 74/89.15 |
| 4,718,291 | * | 1/1988 | Wood et al. ........................ 74/89.15 |
| 4,753,122 | * | 6/1988 | Nishikawa et al. ................. 74/89.15 |
| 4,919,236 | * | 4/1990 | Karlsson et al. ..................... 187/268 |
| 5,127,281 | * | 7/1992 | Yanawgisawa ..................... 74/89.15 |
| 5,339,704 | * | 8/1994 | Linberg ............................... 74/89.15 |
| 5,906,136 | * | 5/1999 | Yabe et al. .......................... 74/89.15 |

FOREIGN PATENT DOCUMENTS

| 4105090 | | 8/1991 | (DE) . | |
| 4336596 | | 5/1995 | (DE) . | |
| 19525454 | | 1/1997 | (DE) . | |
| 586326 | * | 3/1994 | (EP) ................................... 74/89.15 |
| 1620743 | * | 1/1991 | (SU) ................................... 74/89.15 |

* cited by examiner

*Primary Examiner*—Robert P. Olszewski
*Assistant Examiner*—Paul T. Chin
(74) *Attorney, Agent, or Firm*—Browdy and Neimark

(57) ABSTRACT

A linear drive unit has a threaded rod, and in combing engagement with same a threaded nut (2), from the outer circumference of which a number of equally spaced cogs (3) project in a radial direction. Furthermore, connecting links (4, 5), which extend parallel to the axis of the threaded rod inside a housing, are driven via hydraulically or pneumatically actuated pistons, causing the connecting links (4, 5) to move in an axial direction. During this oscillating movement the connecting links act upon cogs (3) that project from the threaded nut (2). The force exerted via the cogs (3) located on the outer circumference of the threaded nut (2) causes the threaded nut (2) to be put into an incremental rotation, which, in turn, causes an incremental linear shifting of the threaded rod (1).

11 Claims, 6 Drawing Sheets

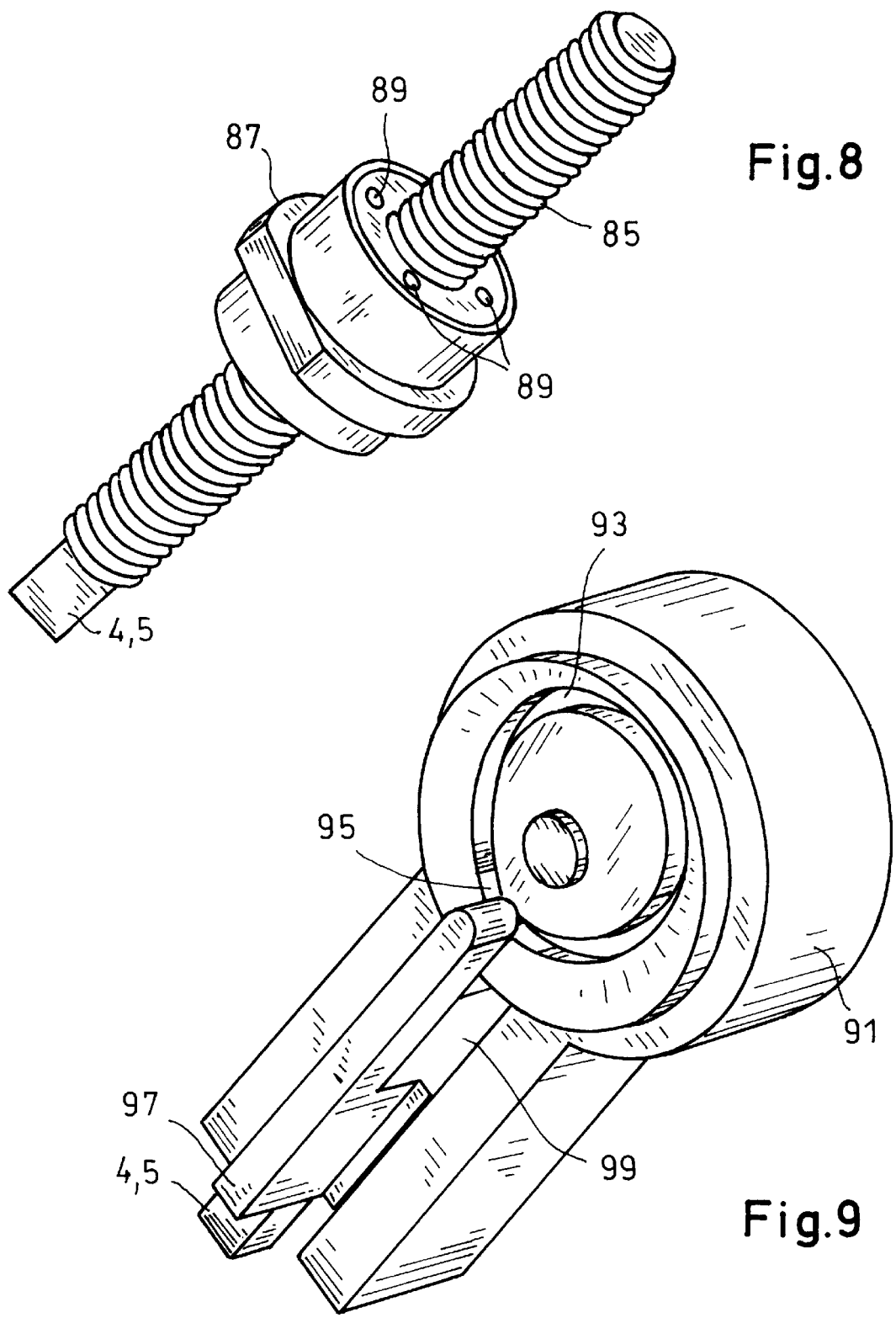

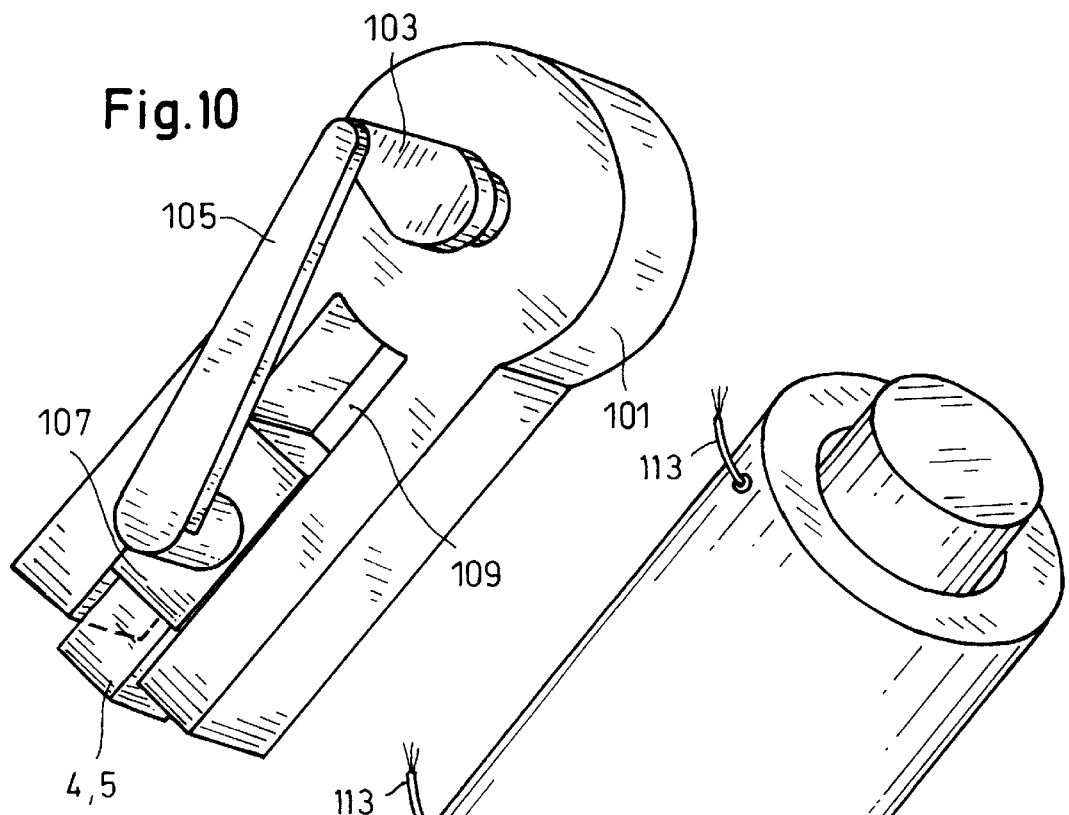

LINEAR DRIVE UNIT

FIELD OF THE INVENTION

The present invention relates to a linear drive unit.

REVIEW OF THE RELATED TECHNOLOGY

Known linear drive units, such as sliding nuts and roller nuts, are usually driven by means of electric motors either directly or via a cogwheel and/or belt drive. This kind of drive unit has its shortcomings. One is that the electric motor must be mounted in direct proximity to the linear drive unit. Also, it has proven particularly disadvantageous that in order to determine the respective current position of a linear drive unit, electrically operated measuring systems such as encoders or gages are usually needed, with the aid of which information can be obtained regarding the actual position of the motor, the gear, or the linear drive unit itself. This is noted in German patent DE 195 25 454 A1.

Still another disadvantage is that known linear drive units can generally not be used whenever specific requirements regarding the surrounding environment prohibit the use of electrical or metallic components, as these can impact or interfere, to varying degrees, with electrical or magnetic fields.

SUMMARY OF THE INVENTION

The present invention has an object, among others, to overcome deficiencies in the prior art such as noted above.

It is, therefore, a particular object of the present invention to improve a linear drive unit so that any required positioning of the drive unit can be performed and ensured reliably without additional expenditure.

In accordance with a first preferred embodiment of the present invention, a linear drive unit has a threaded rod and, in combing (meshing) engagement with the threaded rod, a threaded nut forming a unit with a cog ring having a number of equally spaced cogs projecting in a radial direction from its outer circumference. The threaded nut, furthermore, preferably has two assigned connecting links, which are guided inside a housing of the linear drive unit in a direction parallel to the axis of the threaded rod. The connecting links can be driven back and forth in the axial direction.

During each oscillating movement of one of the connecting link (i.e., a movement from one end position designated as the starting position, to the other end position of the one connecting link, and back again into its starting position), the one connecting link acts upon the cogs projecting from the cog ring, with the result that the force exerted via the cogs is converted, in increments, into a rotary motion of the threaded nut, thereby causing a linear shifting of the threaded rod.

In accordance with a second preferred embodiment of a linear drive unit in accordance with the present invention, the threaded rod, in contrast to the above-described embodiment, has forms a unit with a cog ring having a number of equally spaced cogs that project in a radial direction, analogously to the cogs projecting from the threaded nut of the first embodiment. As in the first embodiment the rod is in meshing engagement with a threaded nut.

In the second embodiment an oscillating movement occurs in one of the connecting links, which is moved to and fro in the axial direction, as in the first embodiment. During this oscillating movement the connecting link acts upon the cogs that project from the threaded rod so that the threaded rod, which is installed so that it can rotate within the housing, is driven into an incremental rotation, causing the threaded nut to perform a linear movement in proportion to the pitch of its thread.

In an advantageous embodiment of the invention, depending on the desired direction of the linear movement, one or the other of preferably two connecting links may by driven, for example, via hydraulically or pneumatically activated pistons. The connecting links may also be driven via ball screws, cam disks, or cam mechanisms or, if the impact on electrical or magnetic fields is not an issue, via lifting magnets.

An exact definition of the linear drive unit can be established via the number of lifting strokes when the connecting links, which are guided parallel to the axis of the threaded rod, are operated with this type of drive (for example via hydraulically or pneumatically actuated pistons that cause the connecting links to be moved from their starting position into one end position and back again into the starting position).

The design of the linear drive unit according to the present invention thus permits an operation during which no position measurements need to be performed, because the position of the actuator designed in the form of a linear drive unit according to the invention is immediately and directly related to the number of movement increments which have been performed, each of which, as specified above, corresponds to one to-and-fro movement of the last activated connecting link from its last known position, which may be determined or measured according to a known and customary method, for example via a reference marking.

The reference marking and monitoring of the number of oscillating strokes may be in the form of light barriers, for example, which are activated through light conductors. In this way the new position reached in relation to the known starting position can be verified, and optionally also determined directly at the linear drive unit, without requiring any additional, relatively complex electronic components.

That is, the amount of axial translation is proportional to the number of oscillating strokes, so counting the number of strokes gives the exact location of the rod within the mechanical precision of the threads, backlash, etc.

If the linear drive unit is to be used in metrology, for example as a positioning unit, and in order to not only prevent but exclude from the outset any impact on or interference with electrical or magnetic fields, then all components of the linear drive unit according to the invention are preferably manufactured from materials such as polyamide, polyvinyl chloride (PVC), polyoxymethylene (POM), or the like, the use of which guarantees that no electrical or magnetic fields are impacted, let alone disrupted in any way. In other words, the reliable functioning of the linear drive unit according to the present invention is ensured even though absolutely no metallic components are used.

BRIEF DESCRIPTION OF THE DRAWING

The above and other objects and the nature and advantages of the present invention will become more apparent from the following detailed description of embodiments taken in conjunction with drawings, wherein:

FIG. 8 is a perspective view of driving means in the form of a planetary rolling contact gear.

FIG. 9 is a perspective view of driving means in the form of a cam disk.

FIG. 10 is a perspective view of driving means in the form of a crank mechanism.

FIG. 11 is a perspective view of driving means in the form of a lifting magnet.

DETAILED DESCRIPTION OF THE PREFERRED EMBODIMENT

Figure 1:
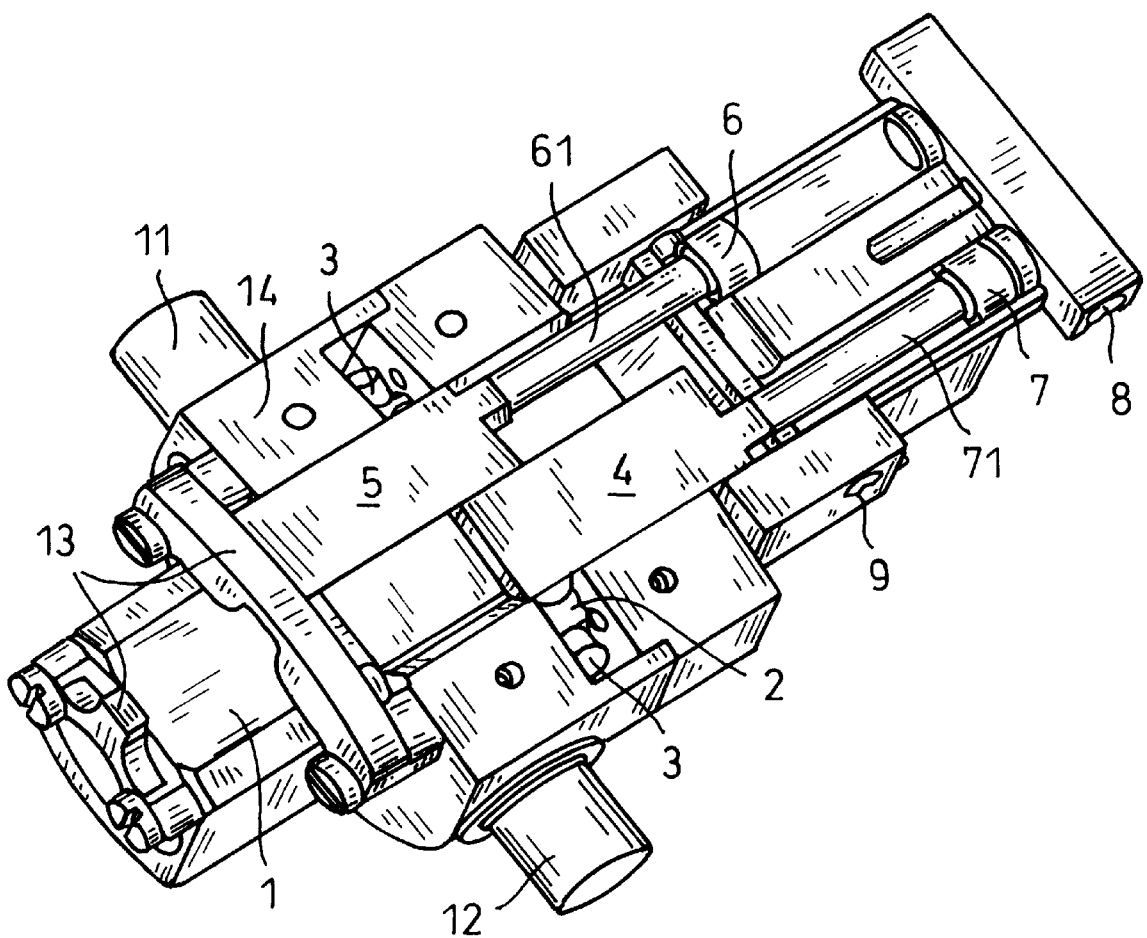
FIG. 1 is an enlarged perspective overview showing a linear drive unit that is activated via hydraulic pistons.

FIG. 1 illustrates the linear drive unit according to the invention. Slidably-guided connecting links 4 and 5 are provided inside a housing 14, such that the connecting links 4, 5 can be operated via piston rods 61 and 71, respectively. The piston rods 61, 71 are in turn operated by means of hydraulically actuated pistons 6 and 7.

In FIG. 1 the connecting link 4 is shown in its starting position, which corresponds to one end position, whereas the connecting link 5 is shown in the second end position.

The hydraulic fluid required for the actuation of the hydraulic pistons 6 and 7 is transported via feeder lines (not shown) to inlet openings 8 and 9, respectively. Provided at the other end of the hydraulic fluid feeder lines is a preferably electrically-activated hydraulic unit.

In FIG. 1 the end of a threaded rod 1 is visible in the left foreground, and a threaded nut 2 is visible in the area of the connecting links 4 and 5. (The visible end of the rod 1 is un-threaded, but a portion inside the housing 14 is threaded and engaged with the nut 2.) FIG. 1 shows cogs 3 projecting from the outer circumference of a cog ring forming a unit with the threaded nut in a radial direction. In the illustrated preferred embodiment there are a total of twelve cogs 3, although only two of the cogs 3 are visible in FIG. 1. FIGS. 2 to 5 show all twelve of the cogs 3, which project from the outer circumference of the threaded nut 2 in a radial direction and thus, in the preferred illustrated embodiment, have an angular spacing of 30° from one another.

Reference markings may be provided on the housing 14 and/or on the unattached end of the threaded rod 1 at the locations marked with reference numeral 13 in FIG. 1. These reference markings may then be used to check and monitor a newly reached position relative to the known starting position without the need for any additional, and generally relatively complex, electronic components.

FIG. 1 furthermore shows two tubular projections 11 and 12, which extend perpendicular to the axis of the threaded rod 1 and may be used to fasten the housing 14 in a pivoting connection to a holding device not shown in the drawing.

Figure 2:
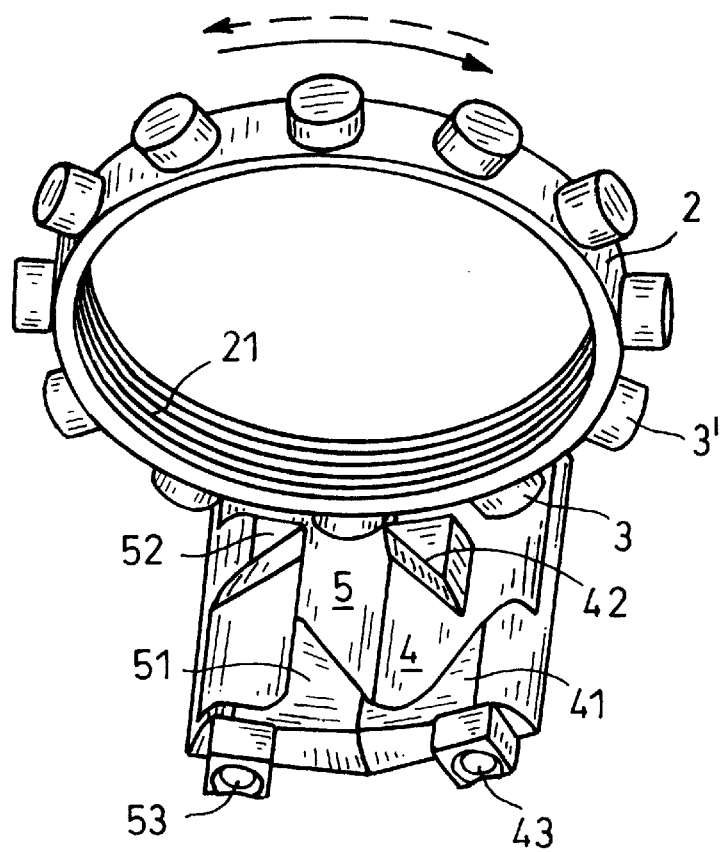
FIGS. 2–5 are perspective views of the cogged threaded nut and connecting links, illustrating the course of an oscillating movement of one of two connecting links and the resulting rotation of the threaded nut by one increment.

FIG. 2, a perspective view, shows only the threaded nut 2 with the cogs 3, of which there are twelve in the selected embodiment, and the two connecting links 4 and 5 located in their starting positions.

FIGS. 2 through 5 further show a portion of the thread 21 formed inside the threaded nut 2. On the side of the two connecting links 4 and 5 facing the cogs 3 that project from the threaded nut 2, segments 41, 42, and 51, 52 of a steep-pitched thread are visible that is formed on the connecting links.

In FIGS. 2 through 5, fastening locations 43 and 53 are furthermore shown at the lower ends of the two connecting links 4 and 5, which represent the contact points of the piston rods 61, 71 of the hydraulically actuated pistons 6 and 7. For reasons of simplicity, the piston rods 61, 71 are omitted from FIGS. 2 to 5.

When the connecting link 4 is operated via the hydraulically actuated piston 7, the threaded nut 2 is rotated in the direction indicated by a solid arrow, as will be explained in more detail below, whereas an actuation of the connecting link 5 via the hydraulically actuated piston 6 will cause the threaded nut 2 to be rotated in the direction of the arrow indicated by the dashed line in FIG. 2.

To continue the rotation of the threaded nut 2 in increments of the angle distance between two cogs 3, both the forward lift of the pistons 4 or 5 from the starting position shown in FIG. 2, and the reverse lift of the pistons into the starting position, are utilized.

The following is a detailed description of a rotation increment, which is performed via a dual lift in the form of a forward lift and a reverse lift of the connecting link 4 in the rotation direction indicated by the solid arrow.

Figure 3:
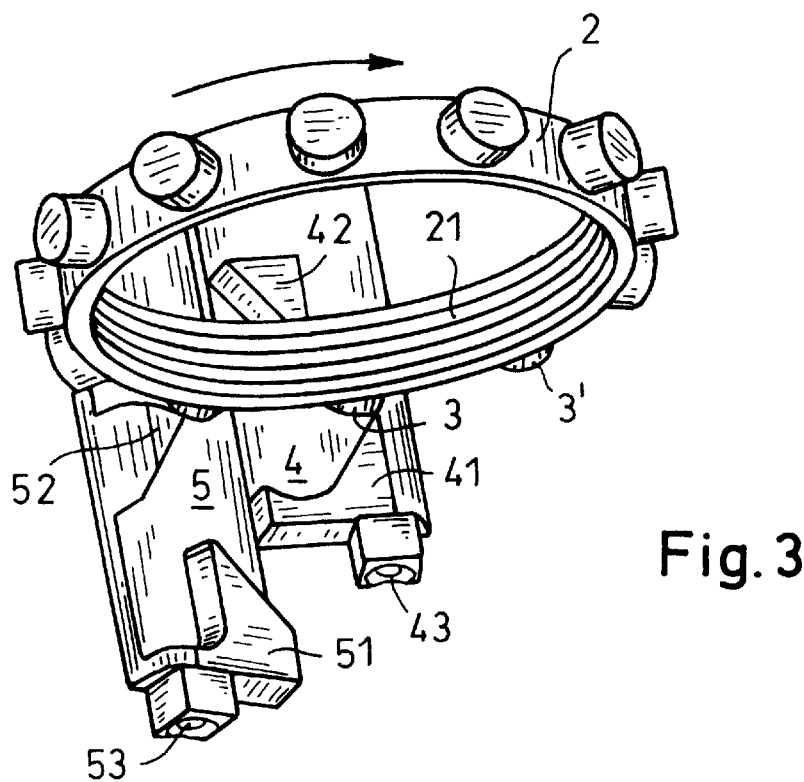

As explained above, in FIG. 2 both connecting links 4 and 5 are located in the starting position. FIG. 3 illustrates the beginning stage of the engagement of segment 41 of the connecting link 4 with the single cog marked with the reference numeral 3. To be able to show the incremental rotation, the cog adjacent to cog 3 has been marked with the reference numeral 3', in FIGS. 2, 3, and 5.

Figure 4:
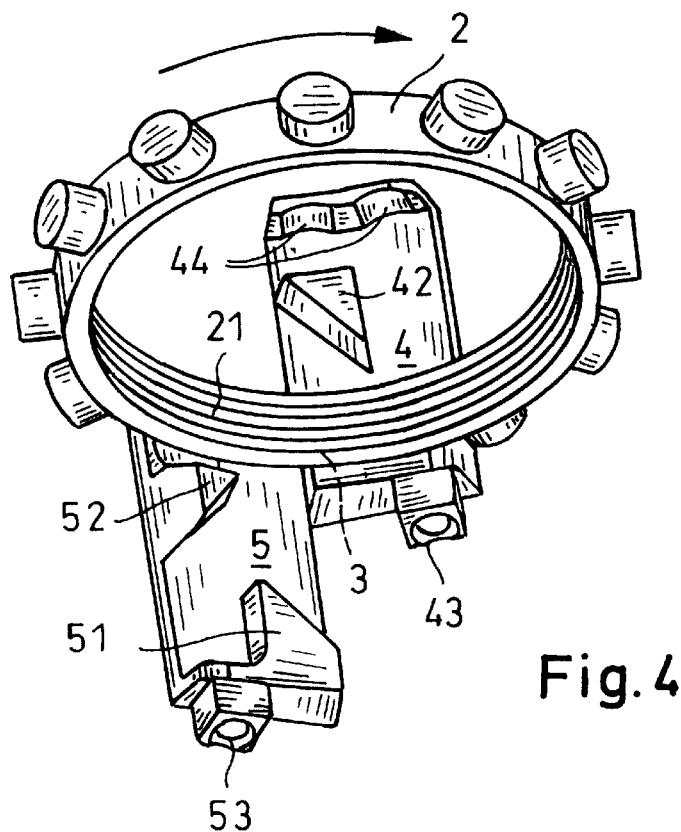

In FIG. 4, the connecting link 4 is located in its upper end position relative to its starting position in FIG. 2, which means that a forward lift was performed with the connecting link 4. As a result, the threaded nut 2 has already been rotated by half the distance from cog center to cog center, for example between the two cogs 3 and 3', in the direction indicated by the solid arrow. In FIG. 4 a dashed line, marked with the reference numeral 3, indicates the position of the cog 3, which is not visible in FIG. 4.

FIG. 4 furthermore shows serrations 44 formed on the connecting link 4; the corresponding serrations on the connecting link 5 are not shown in the drawing. To guard against unintentional turning of the threaded nut 2, the connecting link 5, which is shown in its resting position in FIGS. 2 to 5, holds pairs of the cogs 3 that project from the threaded nut 2, and thereby the threaded nut 2 itself, in the respective current position with the aid of the serrations formed on the connecting link 5, which are not shown in FIG. 4 but whose design and placement correspond to the serrations 44 of the connecting link 4.

Figure 5:
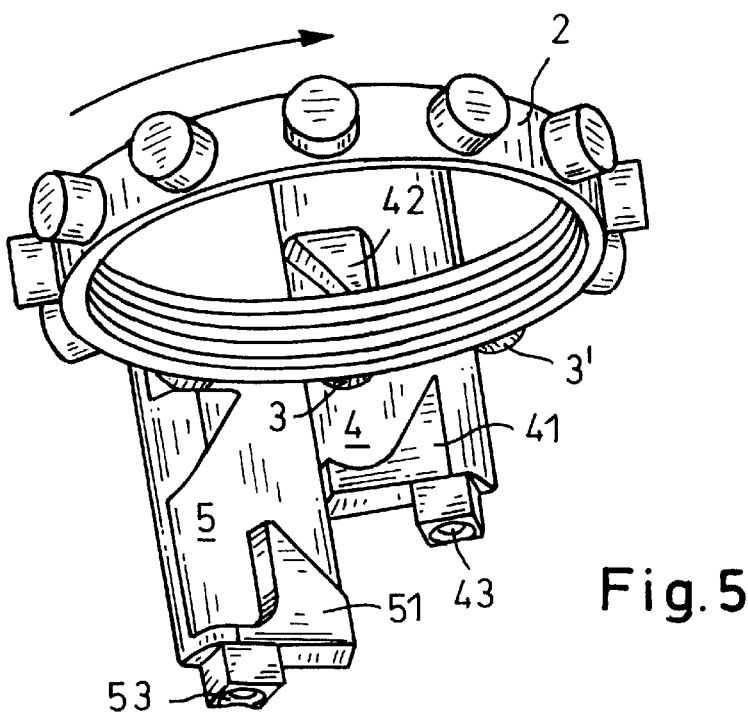

FIG. 5 shows the beginning reverse lift of the connecting link 4 shortly before the thread segment 42 of the connecting link 4 comes into engagement with or to rest on cog 3 of the threaded nut 2 during the reverse lift.

After the completion of the reverse lift of the connecting link 4, the connecting link 4 is again located in the starting position shown in FIG. 2. However, in contrast to the illustration in FIG. 2, the threaded nut 2 has been rotated by one cog distance in the direction indicated by the solid arrow. This means that after completion of the dual lift performed via the connecting link 4, the cog 3' is now in the position in which cog 3 was located prior to the beginning of the dual lift performed via the connecting link 4. (See FIG. 2.)

Due to the completion of the dual lift performed via the connecting link 4, the threaded rod 1, which is in engagement with the thread 21 of the threaded nut 2 of the illustrated embodiment, has been rotated by one twelfth of the thread pitch of thread 21 of the threaded nut 2 in a linear direction along the axial direction of the threaded rod 1. This is not visible in detail in FIGS. 2 to 5.

If the pitch of the rod 1 is 1 mm, for example, the threaded rod is moved in a linear direction by 1/12 mm each time the threaded nut 2 is rotated by an increment of 30°; i.e., the threaded rod is advanced by approximately 0.083 mm in a linear direction.

Figure 6:
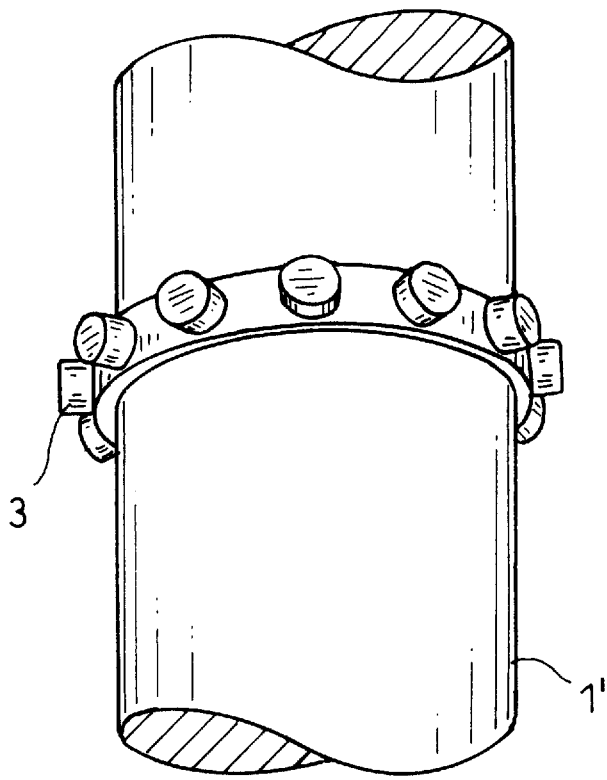
FIG. 6 is a perspective view of a threaded rod forming a unit with a cog ring.

As shown in FIG. 6 the rod 1 may alternatively form a unit with the cog ring having the cogs 3 and act as the cog ring for the screw drive mechanism, including the rod 1 and nut 2.

Figure 7:
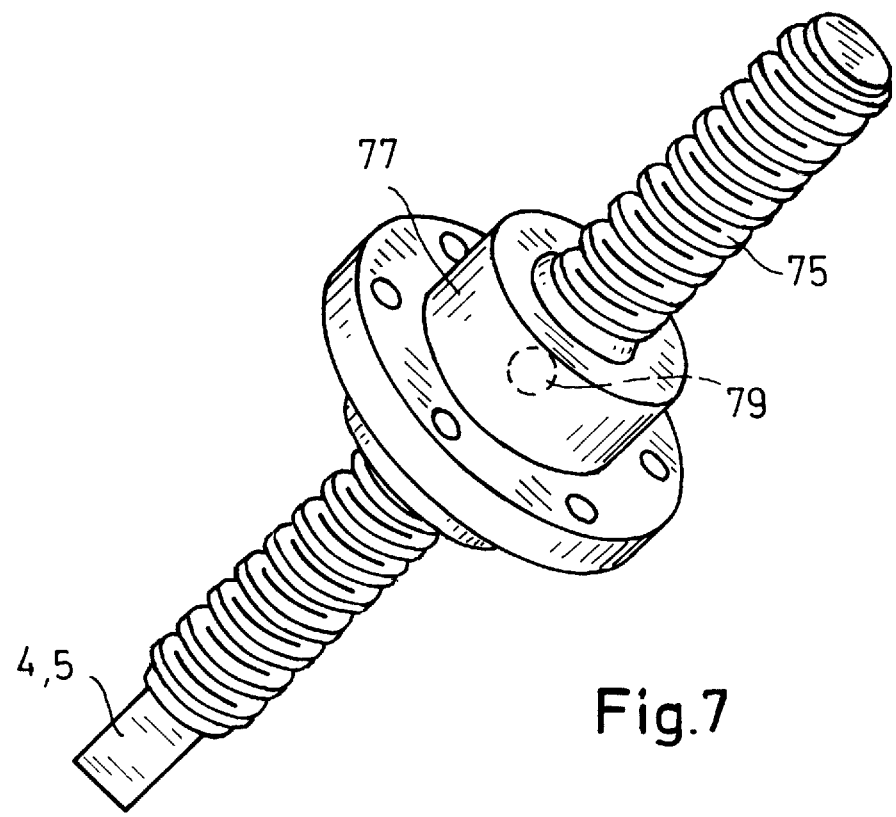
FIG. 7 is a perspective view of driving means in the form of a ballscrew.

FIG. 7 shows a ballscrew embodiment of a driving means including a helically-grooved rod 75 and a nut 77 with balls inside. One ball 79 is illustrated by dashed fine.

FIG. 8 shows a planetary rolling contact gear embodiment of a driving means including a threaded rod 85 and a nut 87 with planetary rollers 89 guided in the nut 87.

FIG. 9 shows a cam disk embodiment of a driving means with a motor 91, a cam groove 93, a pin 95 in the cam groove, and a sledge 97 sliding in a guiding groove 99. The sledge 97 moves to and fro along the groove 99 as the eccentric cam groove 93 is rotated by the motor 91.

FIG. 10 shows a crank mechanism embodiment of a driving means with a motor 101, a crank 103, a rod 105 at the end of the crank, and a sledge 107 sliding in a guiding groove 109. The sledge 107 moves to and fro along the groove 109 as the crank 103 is rotated by the motor 101.

FIG. 11 shows a lifting magnet embodiment of a driving means with a solenoid 111 powerable by electric current through wires 113, and a magnetic rod 115 movable as shown by magnetic force.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means and materials for carrying out various disclosed functions may take a variety of alternative forms without departing from the invention.

Thus the expressions "means to . . . " and "means for . . . " as may be found in the specification above and/or in the claims below, followed by a functional statement, are intended to define and cover whatever structural, physical, chemical or electrical element or structure may now or in the future exist which carries out the recited function, whether or not precisely equivalent to the embodiment or embodiments disclosed in the specification above; and it is intended that such expressions be given their broadest interpretation.

What is claimed is:

1. A linear drive unit, comprising:

a housing (14);

a screw drive having an axis and being disposed generally within the housing, the screw drive comprising a threaded rod (1) in meshing engagement with a threaded nut (2);

a cog ring forming a unit with the threaded nut (2) or rod (1), centered on the axis and comprising a number of projecting cogs equally spaced along a circumference thereof, rotation of the cog ring about the axis causing a relative axial translation between the rod and the nut; and a connecting link (4, 5) extending axially parallel to the axis of the threaded rod, the connecting link being movable to and fro in an axial direction, to rotate the cog ring in increments;

wherein an incremental axial shifting of the threaded rod (1) or nut (2) relative to the housing occurs.

2. The linear drive unit according to claim 1, comprising a pair of connecting links.

3. The linear drive unit according to claim 2, wherein each of the connecting links comprises serrations (44) preventing an unintentional rotation of the cog wheel.

4. The linear drive unit according to claim 1, comprising hydraulically actuated pistons (6, 7) driving the connecting links (4, 5).

5. The linear drive unit according to claim 1, comprising a pneumatically actuated piston driving the connecting link (4, 5).

6. The linear drive unit according to claim 1, comprising a cam disk (93, 97) driving the connecting link (4, 5).

7. The linear drive unit according to claim 1, comprising a crank mechanisms (101, 105) driving the connecting link (4, 5).

8. The linear drive unit according to claim 1, comprises a ballscrew driving the connecting link.

9. The linear drive unit according to claim 1, comprising a planetary rolling contact gear driving the connecting link.

10. The linear drive unit according to claim 1, wherein the screw drive is manufactured entirely from materials that do not interfere with electrical or magnetic fields.

11. The linear drive unit according to claim 1, comprising a lifting magnet (111, 115) driving the connecting link (4,5).

* * * * *